March 10, 1964
M. A. HORTON ETAL
3,123,963
COTTON HARVESTER
Filed July 24, 1961
3 Sheets-Sheet 1
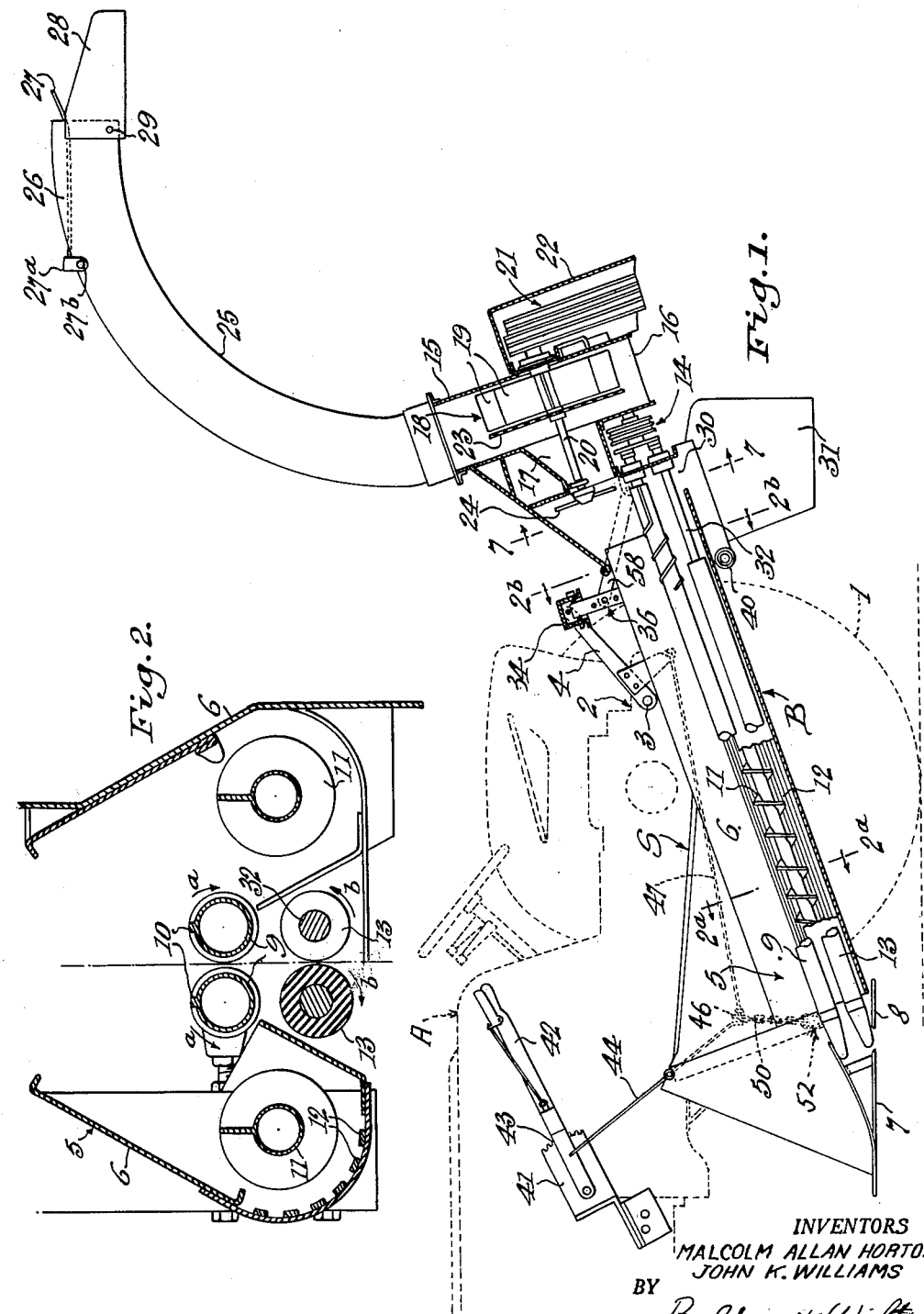
INVENTORS
MALCOLM ALLAN HORTON
JOHN K. WILLIAMS
BY
Baldwin & Wight
their ATTORNEYS

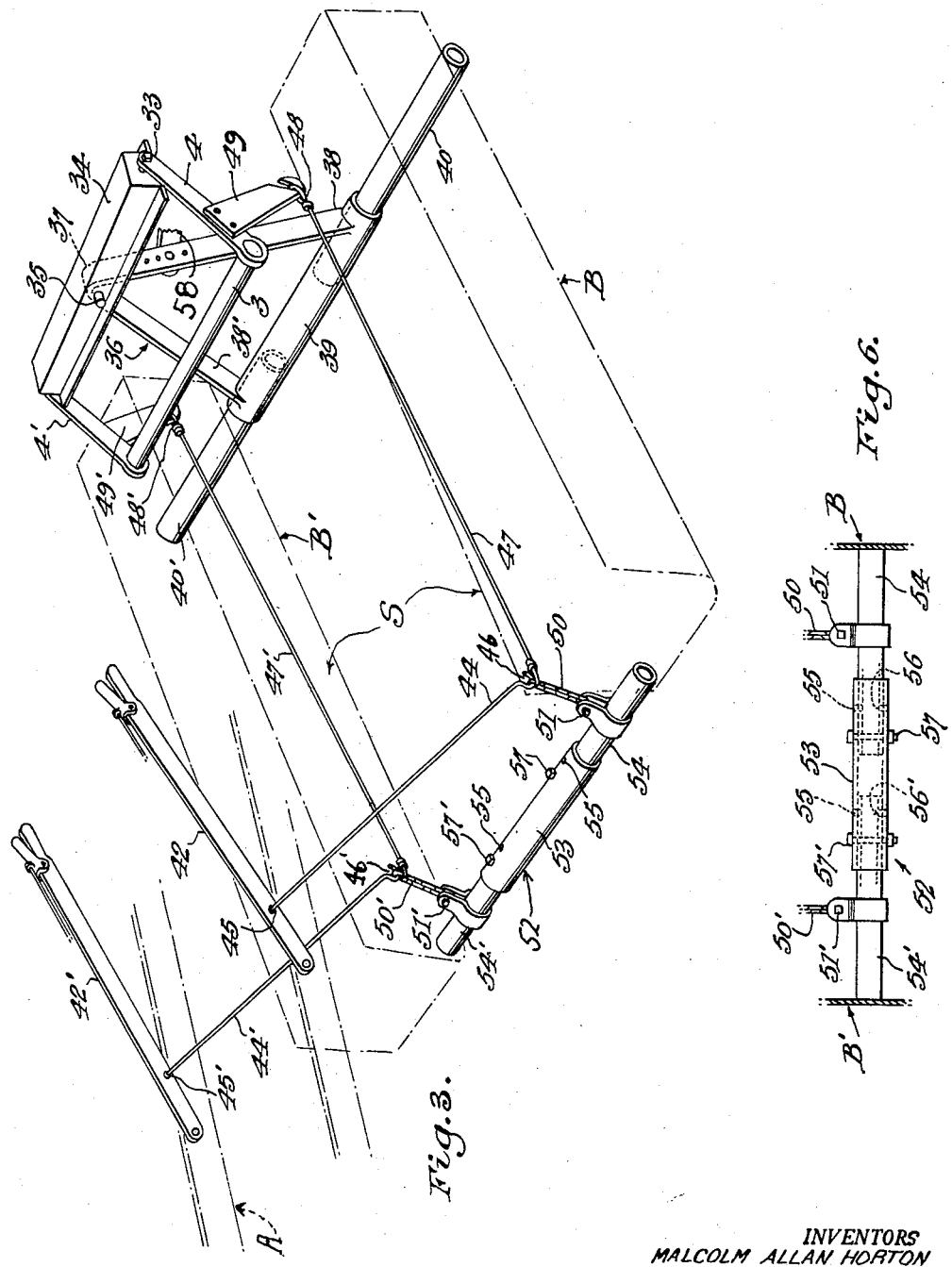

March 10, 1964
M. A. HORTON ETAL
3,123,963
COTTON HARVESTER
Filed July 24, 1961
3 Sheets-Sheet 3
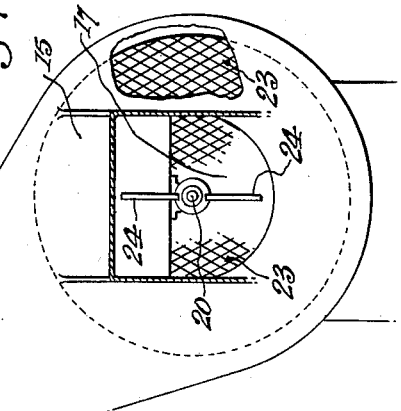
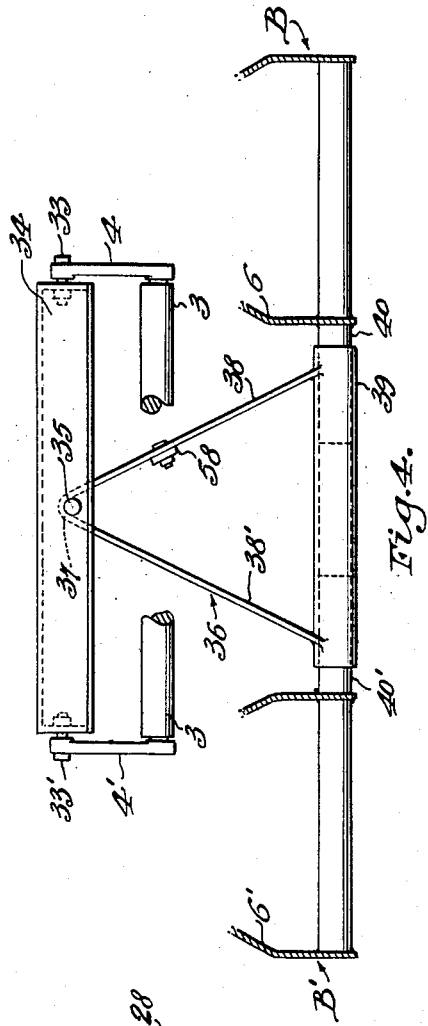
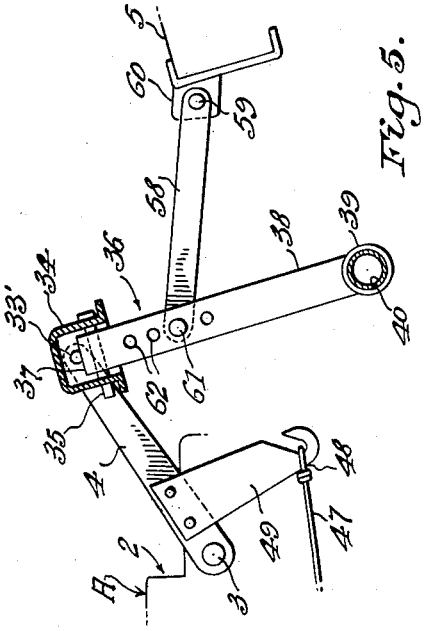
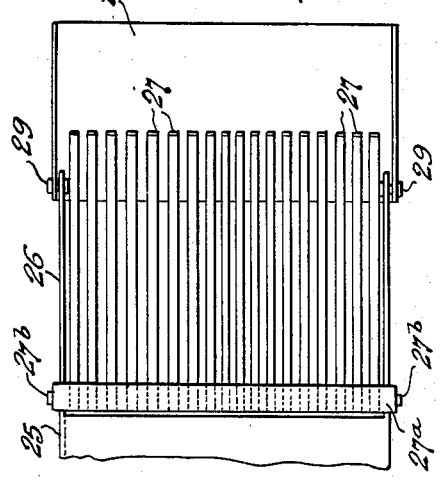
INVENTORS
MALCOLM ALLAN HORTON
JOHN K. WILLIAMS
BY
Baldwin & Wight
their ATTORNEYS 3,123,963
COTTON HARVESTER
Malcolm Allan Horton and John K. Williams, Waco, Tex., assignors to Central Texas Iron Works, Waco, Tex., a corporation of Texas
Filed July 24, 1961, Ser. No. 126,203
12 Claims. (Cl. 56—33)

This invention relates to cotton harvesters, and more particularly to machines which strip cotton bolls from standing rooted stalks as the machines are moved down a row or rows of cotton plants.

Machines of this general class are now well known and widely used. Quite commonly, they comprise a mobile main frame, as for example the frame of a self propelled tractor, and harvester units supported respectively on opposite sides of the mobile frame so as to operate upon two spaced rows of cotton plants as the machine moves down the rows. Since cotton field terrains vary, both as to natural slopes and as to more local irregularities, due for example to planting or cultivation, the suspension of the harvester mechanism on the mobile frame should enable the mechanism to adjust its position automatically to suit relatively small deviations from ordinary conditions, and enable the operator to set or adjust the suspension structure according to overall conditions generally prevailing in a particular harvest area.

An object of the present invention is to provide a harvester, particularly suited for harvesting cotton from standing stalks, including an improved construction for suspending the harvester mechanism from a main frame, the suspending structure being characterized, inter alia, by simplicity, adaptability to different harvesting conditions, and facility of adjustment to suit different conditions.

Another object of the invention is to provide a harvester of the general class referred to above, but including improved means for removing stripped cotton bolls and forwarding the bolls to a collection point, as for example a cart moving through the field with the harvester.

A further object of the invention is to provide such a harvester with improved means for minimizing delivery of stalks with stripped bolls, and for effectively separating green bolls and "trash," e.g. pieces of stalks, rocks and the like, from the stripped mature bolls.

Other objects of the invention will become apparent from a reading of the following description, the appended claims, and the accompanying drawings, in which:

FIGURE 1 is a fragmentary view, partly in side elevation and partly in vertical section, of a cotton harvester embodying the invention, portions of a tractor being shown in dotted lines;

FIGURE 2 is a transverse, generally vertical section of a cotton harvester mechanism unit, the left half of FIGURE 2 being a section through the harvester unit adjacent the front or leading end thereof at the line 2ª—2ª in FIGURE 1; and the right half of FIGURE 2 showing a section of the harvester unit adjacent the rear or trailing end thereof on the line 2ᵇ—2ᵇ of FIGURE 1, certain parts being omitted in order to more clearly show stripping and stalk ejector rolls and cotton boll conveyors;

FIGURE 3 is a fragmentary perspective view of the structure for suspending two harvester units respectively on opposite sides of the tractor main frame, the harvester units being schematically indicated in dot-dash lines;

FIGURE 4 is a view, drawn on an enlarged scale, showing only parts of the two harvester mechanism frames or housings in vertical section, and showing part of a suspension structure in elevation, related parts such as stripping and ejector rolls, and conveyors being omitted;

FIGURE 5 is a fragmentary detailed side elevation of parts of the suspension and elevating structure shown in FIGURE 4, and associated bracing structure;

FIGURE 6 is a detailed elevation of a cross connection means for connecting the front ends of two harvester units, portions of which are shown in vertical section;

FIGURE 7 is a detailed transverse sectional view on the line 7—7 of FIGURE 1, on an enlarged scale and showing a trash breaker and a blower screen in elevation; and FIGURE 8 is an enlarged scale top plan view of the upper rear end portion of a cotton boll discharge conduit and associated trash separation fingers and boll discharge direction chute shown in side elevation in FIGURE 1.

A preferred form of the harvester is shown as being embodied in a cotton harvester structure which, in an overall sense, includes a mobile main frame A supported on and for movement over the ground, as along rows of growing or standing cotton, and two harvester units B and B' extending alongside the main frame on opposite sides thereof. The units B and B' are connected together in a manner hereinafter described to be integrated into a harvester assembly. The suspension means, generally designated S, which will be described hereinafter in detail, is so constructed and correlated with the main frame A and harvester assembly as to provide in effect a three point suspension having considerable flexibility for enabling the harvester units to be adjusted, and, in fact, to adjust or adapt themselves automatically to the usual relatively small deviations of the plant rows from straight lines, the suspension means being also well adapted for enabling adjustment of the mechanism units vertically to suit the slope or nature of the ground.

In the illustrative embodiment, the main frame A is constituted by the frame of a motorized tractor equipped with power driven rear ground wheels 1, one of which is shown in FIGURE 1, the two ground wheels being positioned to straddle two adjacent rows of cotton plants. As is well known with respect to standard forms of tractors of this kind, a steerable front wheel or front wheel assembly, not shown, is positioned in advance of the ground wheels 1 and between the latter so as to run down between the two adjacent rows spanned by the ground wheels 1.

The tractor further includes a power lift mechanism, generally designated 2, adapted to be driven in a known manner by the main tractor engine, not shown. The power lift mechanism 2 includes a power operated shaft 3 which projects transversely of the tractor frame to opposite sides of the longitudinal center line of the tractor, the shaft 3 being provided adjacent its opposite ends with power lift arms 4—4'.

The two harvester units B—B' are similar in construction except as to one being of the right hand sense and the other of the left hand sense, so that the illustration and description of the unit B will suffice for both. As shown in FIGURES 1 and 2, the unit B comprises a mechanism frame and housing 5 having side walls 6 separated longitudinally at the center of the unit to provide a plant receiving slot extending through the unit from front to rear and parallel to the direction of movement of the harvester over the ground. On the opposite sides of the central slot and at the front of the frame 5 are laterally spaced guide or pick-up fingers 7, one of which is shown in FIGURE 1. As the harvester moves down the plant rows, the stalks are received between the pick-up fingers 7 and are guided into the slot midway between the housing side walls. The fingers 7 and runners 8 at the front of the mechanism frames 5 may engage the ground so as ot limit downward movement of the front ends of the harvester units, although the suspension structure S also determines the elevation of the units B and B', especially when the harvester is being moved from place-to-place without harvesting. The pick-up fingers and their relation to the slotted housing structures are generally similar to those of a number of known cotton harvester equipments, for example of the kind shown in Patent No. 2,306,058 granted August 20, 1946 to Claude T. Boone. The specific details of the pick-up fingers and slotted frame or housing structures beyond what is disclosed in the present application do not constitute parts of the present invention and therefore need not be further described.

Within the housing or frame 5 of the unit B and extending longitudinally of the unit is a pair of stripper rolls 9 spaced from each other and disposed respectively on opposite sides of the central longitudinal vertical plane or slot of the mechanism frame 5. Each of the stripper rolls 9 is formed with a longitudinally extending rib 10. In operation, the rolls 9 are rotated oppositely to one another, in the directions of the arrows $a, a$, the contiguous surfaces of the rolls moving upwardly, with the result that cotton bolls are stripped from stalks extending upwardly between the rolls 9. The stripped bolls are tossed upwardly and outwardly by the ribber rolls 9 so as to drop at opposite sides of the frame 5 to be picked up by screw conveyors or augers 11 which move the bolls to the rear of the unit for being picked up and discharged by mechanism to be described later. Unavoidably, some "trash," including for example rocks, hard lumps of earth and other foreign matter, will find its way into the conveyor troughs. In order to prevent the trash from being delivered to the boll discharging mechanism, or to minimize such delivery, the conveyor troughs are formed at their bottoms and outer sides with spaced longitudinally extending slats 12 between which the trash, or most of it, may drop back to the ground.

Some stalks which are not very well rooted, may be pulled out of the ground by the harvesting mechanism. In order to prevent pulled-out stalks from being carried back to the boll delivering mechanism, a pair of ejector rolls 13 is mounted below the stripper rolls 9. The ejector rolls 13 are positioned similarly to the stripper rolls 9, that is, respectively on opposite sides of the stalk receiving slot; but the ejector rolls are of larger diameter than the stripper rolls, the clearance between the ejector rolls being less than the clearance between the stripper rolls. The ejector rolls are rotated oppositely to one another in the direction of the arrows $b, b$ in FIGURE 2, the contiguous surfaces of the rolls 13 moving downwardly, with the result that stems or stalks, in part resting on the stripper rolls 9 and in part projecting downwardly between the stripper rolls and the ejector rolls, are pulled downwardly and dropped upon the ground instead of being carried rearwardly by the stripper rolls 9. In this way, clogging of the boll discharging mechanism, to be described later, by accumulation of stalks is prevented, Moreover, the ejector rolls are operated at a surface speed of rotation approximately the same as the ground speed of the harvester so that the ejector rolls will also prevent the uprooting of a large perecentage of the poorly rooted stalks.

The rolls 9 and 13 and the augers 11 may be driven by any suitable mechanism. As is well known, many harvesting mechanisms are driven from the ground wheels as they rotate during movement of the harvester over the ground. However, in the illustrated embodiment, the rolls 9 and 13 and the augers 11 are driven through a belt and pulley drive mechanism generally designated 14, which is operable by the tractor engine through suitable driving connections, not shown.

The mechanism frame 5 is constructed to include at its rear end a blower housing 15 which is open at its bottom as indicated at 16. The front side of the housing is formed to provide an air induction passage 17 located over the rear ends of the rolls 9 and 13 and the augers 11. Mounted within the blower housing 15 is a radial vane impeller 18 having vanes 19, sometimes termed fan or blower paddles, fixed to and extending outwardly from a blower shaft 20 in accordance with well known blower or fan constructions of this type. The blower may be driven in any suitable manner, although, in the form shown, the drive is effected through a belt and pulley mechanism generally designated 21 enclosed within a housing 22 and being operable through connections, not shown, by the main tractor engine.

In operation, as the harvester proceeds down the plant rows, bolls stripped from the stalks and carried rearwardly by the augers 11 are picked up by the air stream flowing upwardly through the blower housing 15, the bolls entering through the air induction passage 17 and flowing out of the top of the housing 15. The induction passage 17 leads to the blower in a direction generally normal to the plane of rotation of the impeller 18. In order to prevent bolls flowing directly towards the impeller from entering between the vanes 19, a screen 23 is fixed to the blower shaft 20 at the sides or edges of the vanes facing the induction passage 17, the screen 23 being spaced sufficiently from the adjacent wall of the housing 15 to provide clearance for the passage of the bolls upwardly between the wall and the screen without clogging the blower. In a preferred construciton, the screen is constituted by expanded metal, as more clearly shown in FIGURE 7.

Despite the ejector rolls 13, which have been found to operate very effectively in practice, some stalk pieces of substantial length and other trash may reach the rear ends of the rolls 9 and 13 and augers 11, and be picked up in the air induction stream flowing through the passage 17 which opens immediately above the rear ends of the rolls and augers. Trash of this kind, especially fairly long pieces of stalks, unless properly dealt with, would have a tendency to clog the air induction passage 17 or the clearance between the screen 23 and the adjacent wall of the housing 15. In order to obviate this difficulty, a trash breaker 24 is mounted to span the induction passage 17 and to break up elongated pieces of trash, for example stalk portions, before they can pass through the passage 17. Best results have been obtained by forming the trash breaker 24 as a rod or wire of spring metal, for example steel, and mounting it on the blower and breaker shaft 20 to span the induction passage 17 transversely. Importantly, the breaker 24 is positioned to span the air stream flowing from the point of pick up of bolls at a location up stream from the screen 23, that is between the screen 23 and the conveyors 11. As so arranged and positioned, the breaker rod 24 reduces any stalk sections picked up in the air stream into such small pieces that they may readily flow through the blower housing without jamming the screen 23 and without clogging the induction passage 17 or the clearance between the screen 23 and the adjacent blower housing wall. The breaker wire 24, being of spring metal, and being somewhat blunt, neither cuts through cotton bolls nor abruptly stops nor sharply decelerates the blower shaft 20 upon striking an unusually large piece.

Harvested cotton bolls are delivered from the blower housing 15 into a conduit 25 which is curved upwardly and rearwardly for discharging cotton bolls, usually into a trailing cart, not shown, drawn by the tractor. Some small trash, for example stalks broken up by the breaker wire 24, will flow upwardly through the discharge conduit 25 with the cotton bolls. In order to reduce the amount of small trash particles delivered into the trailing cart, the top wall of the upper end of the conduit 25 is cut away at 26, leaving only the conduit bottom and side walls at the discharge end. The cut away portion of the conduit 25 is spanned by an assembly of spaced fingers 27, preferably of spring metal, carried by a strap 27a pivoted at 27b to the conduit side walls. Preferably, the rear ends of the fingers 27 are turned or inclined upwardly as most clearly shown in FIGURE 1. The arrangement is such that as both cotton bolls and small pieces of trash arrive at the top end of the conduit 25, the bolls, being very light and somewhat wider than the slots between the fingers 27, are guided by the finger assembly so as to be discharged rearwardly through a trajectory controlling deflector 28 pivoted at 29 on the conduit 25. Bolls striking the fingers 27, although at considerable speed, are so light as not to exert sufficient centrifugal force to force their way between the fingers. However, pieces of trash, being heavier than the bolls and travelling at the same speed, will exert greater centrifugal force, are therefore not so easily maintained in the intended direction of travel of the bolls, and will force their way between and beyond the fingers 27 so as not to be discharged with the bolls into the trailing cart.

Rocks, green bolls and relatively dense trash which may be carried to the rear of the conveyor troughs by the augers 11 may be sufficiently heavy so as not to be picked up by the induction air stream. In order to separate such foreign matter from the cotton bolls, each side of the mechanism housing B is formed at its rear end with a trash discharge opening 30 at the bottom of the conveyor trough. Heavy trash may drop through the openings 30 into collection boxes 31 which may be emptied from time to time. The ejector rolls, being disposed quite close to one another, would tend to prevent trash from dropping to the openings 30 but for the fact that the ejector rolls are formed at their rear ends with portions 32 of reduced diameter, thus providing ample space for the dropping out of trash which may have been carried rearwardly above the rolls 13.

In accordance with the invention, the suspension structure S is so constructed and coordinated with the main frame A and assembly comprising the harvester units B and B' that the assembly may have limited side-to-side floating movement at its front end, transversely of the direction of travel of the main frame A over the ground, and may be adjusted with facility to accommodate to different kinds of terrain or slopes. The suspension structure S is capable of raising and lowering both the front and the rear ends of the assembly comprising the units B and B', and preferably is capable of raising and lowering the front and rear ends simultaneously and to coordinated extents. The suspension structure S is generally characterized by suspending the units B and B' on opposite sides of the frame A from three points on the latter. In the form shown, one point is at the rear of the frame A and units B—B' and substantially midway between the latter; and the other two points are at the front ends of the units B—B', transversely between the units, and preferably on opposite sides of the frame A.

In the illustrated embodiment, the power lift arms 4—4' are pivotally connected at 33—33' to a cross bar elevator structure 34 of inverted channel shape having longitudinal stiffening ribs or flanges, the arrangement being such that when the power lift mechanism is operated the cross bar 34 is raised or lowered. Secured to the cross bar 34 midway between the pivots 33 and 33' is a pivot pin 35 extending parallel to the longitudinal center line between the units B and B'. An inverted V-shaped suspension structure 36 has its apex portion 37 passing over and receiving the pin 35, the legs 38 and 38' of the V-shaped member 36 diverging from one another and being welded to a tube or pipe section 39. Secured to each of the mechanism units B and B' are smaller diameter rods or tubes respectively designated 40 and 40'. The rods or tubes 40 and 40' extend inwardly toward one another and into opposite ends of the larger tube 39, thus supporting the rear ends of the units B and B' on the V-shaped structure 36 which is suspended from the main frame A through the intermediary of the power lift mechanism and the cross bar 34. The tubes 39, 40 and 40' provide rear connection means for and extending between the units B and B' to position the rear ends of the units on opposite sides of the main frame A.

Since the apex 37 of the member 36 is merely laid over the pin 35, so to speak, the member 36 is for all practical purposes universally pivotally supported on the pin 35. The looseness of the connection permits the member 36 to tilt about the axis of the pin 35, to tilt about a horizontal axis normal to the axis of the pin 35, and also to rock about a vertical axis passing through the horizontal axis of the pin 35. The latter movement is important for enabling the front ends of the units B and B' to have limited horizontal floating movement for enabling the pickup fingers 7 to follow the plant rows if the latter deviate only reasonably from precise and uniform spacing. The rocking about the horizontal axis of the pin 35 enables the units B and B' to adjust vertically as to height with respect to one another at their rear ends; and the rocking of the member 36 about a horizontal axis transverse to the axis of the pin 35 enables raising or lowering of the front ends of the units B and B' relatively to their rear ends. The universal pivotal joint provided by the pin 35 and the V-shaped member 36 provides the one point of suspension referred to above as being substantially midway between the rear ends of the units B and B'.

The front ends of the units B and B' are shown as being supported for universal movement from two points on opposite sides of the frame A, spaced laterally outwardly of the first suspension point at the pin 35 and apex 37. Again considering the unit B, to which the unit B' is similar except as to right and left hand, a toothed segment 41 is mounted in fixed relation to the main frame A, and provides a pivotal mounting for an adjusting lever 42 equipped with pawl mechanism 43 for holding the lever 42 in adjusted position on the frame. Once the lever 42 has been set in adjusted position, it is stationary with respect to and thus in effect forms a part of the frame A.

A first link part 44 is pivotally connected at 45 to the lever 42 and extends downwardly and rearwardly for universal pivotal connection at its lower end at 46 to the front end of a second link part 47 which extends rearwardly and is pivoted at 48 to an arm 49 fixed to the power lift arm 4. A third link 50 is connected at its upper end 46 to the links 44 and 47 at the zone of connection or juncture of the links 44 and 47. The link 50 extends downwardly and is universally pivotally connected at its lower end 51 to a front cross connection structure 52 extending between the front ends of the units B and B'.

As shown in FIGURE 6, the cross connection structure 52 includes a relatively large diameter tube or pipe 53 positioned between the units B and B', and smaller tubes or pipes 54 and 54' which are secured to the unit mechanism frames and extend respectively into opposite ends of the tube 53. The tubes 53, 54, and 54' are formed respectively with holes 55, 56 and 56' adapted to be registered selectively for receiving bolts 57 and 57' to secure the front ends of the units B and B' in predetermined spaced relation. The connections between the tubes 54 and 54' and the tube 53 have sufficient play to enable the front ends of the units B and B' to move vertically relatively to one another, as by tipping, to the small extent needed to permit the leading ends of the units B and B' to accommodate themselves to ordinary departures of the ground from a perfectly level condition. The rear connection means provided by the tubes 39, 40 and 40', and the front cross connection structure 52 integrate the units B and B' into a harvester assembly.

The suspension for the front end of the harvester on the side on which the unit B' is carried is similar to the suspension just described with reference to the unit B. Parts of the front suspension at the unit B' side of the frame A are designated by the same reference characters as those designating similar parts on the unit B side, but the reference characters applied to parts at the unit B' side are primed. Thus, the three-link linkage on the unit B' side comprises the lines 44', 47' and 50' which correspond to the links 44, 47 and 50 on the unit B side.

A brace 58 is connected at its rear end at 59 to a bracket 60 at the rear of the mechanism frame 5, and is connected at its front end to the leg 38 of the V-shaped suspension member 36 by means of a pin 61 fitted into a selected one of a plurality of positioning holes 62 in the leg 38. The brace 58 assists in supporting the rear end of the mechanism frame 5 which has to carry considerable weight, including that of the blower and driving mechanism. There is no functional relative movement between the brace 58, the V-shaped member 36 and the mechanism frame 5.

In operation, the levers 42 and 42' and power lift mechanism may be set to determine the approximate level of suspending the front and rear ends of the units B and B'. During harvesting, the harvester assembly comprising both units B and B' may conveniently be raised and lowered by operation of the power lift mechanism 2, for example for lifting the units to pass over an obstruction and then lowering the units. When the cross bar 34 is raised due to rocking of the power lift arms 4—4' counterclockwise as viewed in FIGURES 1 and 3, the rear cross connection means provided by the pipes or tubes 39, 40 and 40' and hence the rear ends of the units B—B' will, of course, be raised. Simultaneously, the arms 49 and 49', being rocked counterclockwise, will pull rearwardly on the links 47 and 47' so as to tend to move the links 44 and 44' respectively toward alignment with the links 47 and 47'. This will lift the links 50 and 50', thus raising the front ends of the units B and B', but to a somewhat lesser extent than the raising of the rear ends of the units. The differential between the amount of raising of the front and rear ends of the units may be controlled by selective setting of the levers 42 and 42'.

The three-link linkages are very flexible, considered as linkages, and may be formed of link members of different kinds. In the illustrative embodiment, the links 44 and 47 and their counterparts 44' and 47' are constituted by rods, and the links 50 and 50' are chains, being themselves flexible. Cables or other elongated links may be used.

The construction shown and described embodies the invention in a preferred form, but it is intended that the disclosure be illustrative rather than definitive, the invention being defined in the claims.

We claim:

1. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; cross connection means extending between said units across said main frame and being connected to said mechanism frames for positioning said units on opposite sides of said main frame and for integrating said units into a harvester assembly; and three universal movement suspension means movably interconnected between said main frame and said assembly and spaced from each other to provide a three-point suspension for said assembly.

2. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; cross connection means extending between said units across said main frame and being connected to said mechanism frames for positioning said units on opposite sides of said main frame and for integrating said units into a harvester assembly having front and rear ends; and three-point suspension means for suspending said assembly from said main frame and comprising a first universal movement means suspending said assembly from said main frame at one point substantially midway between said units adjacent one end of said assembly, and two other universal movement means adjacent the other end of said assembly suspending said assembly from said main frame at two other points spaced oppositely laterally outwardly from said one point.

3. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; cross connection means extending between said units across said main frame and being connected to said mechanism frames for positioning said units on opposite sides of said main frame and for integrating said units into a harvester assembly having front and rear ends; three-point suspension means suspending said assembly from said main frame at one point substantially midway between said units adjacent one end of said assembly, and at two other points spaced oppositely laterally outwardly from said one point adjacent the other end of said assembly; and means for vertically adjusting the suspension means at said three points simultaneously.

4. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; cross connection means extending between said units across said main frame and being connected to said mechanism frames for positioning said units on opposite sides of said main frame and for integrating said units into a harvester assembly; and three-point suspension means suspending said assembly from said main frame at one point substantially midway between the rear ends of said units and at two other points spaced oppositely laterally outwardly from said one point adjacent the front ends of said units.

5. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; front and rear cross connection means extending between said units across said main frame and being connected respectively to said mechanism frames for positioning said units on opposite sides of said main frame and for integrating said units into a harvester assembly having front and rear ends; and three-point suspension means for suspending said assembly from said main frame and comprising a first universal movement means connected to said main frame and to said rear cross connection means substantially midway between the rear ends of said units, and two other universal movement means connected to said main frame and to the front end of said assembly laterally on opposite sides of said first universal movement means.

6. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; front and rear cross connection means extending between said units across said main frame and being connected respectively to said mechanism frames for positioning said units on opposite sides of said main frame and for integrating said units into a harvester assembly having front and rear ends; a pin carried by said main frame above and laterally midway between the rear ends of said units and above said rear cross connection means; an inverted V-shaped member the apex portion of which passes over said pin and the downwardly extending legs of which diverge laterally and are connected to the rear cross connection means for suspending the rear end of said assembly from said main frame; and two flexible suspension means disposed respectively on opposite sides of said main frame and each being connected to said main frame and to the front end of said assembly for suspending the latter from said main frame.

7. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; front and rear cross connection means extending between said units across said main frame and being connected respectively to said mechanism frames for positioning said units on opposite sides of said main frame and for integrating said units into a harvester assembly having front and rear ends; an elevator structure movably mounted on said main frame to extend laterally to both sides of said main frame adjacent and above the rear cross connection means; a first suspending means movably connected at its upper end to said elevator structure substantially midway between said units and connected at its lower end to said rear cross connection means; and two other suspending means movably connected to said main frame and to said assembly laterally on opposite sides of said first suspending means adjacent the front end of said assembly, and being movably connected respectively to said elevator structure.

8. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; front and rear cross connection means extending between said units across said main frame and being connected respectively to said mechanism frames for positioning said units on opposite sides of said main frame and for integrating said units into a harvester assembly having front and rear ends; an elevator structure movably mounted on said main frame to extend laterally to both sides of said main frame adjacent and above the rear cross connection means; a first suspending means movably connected at its upper end to said elevator structure substantially midway between said units and connected at its lower end to said rear cross connection means; two other suspending means movably connected to said main frame and to said assembly laterally on opposite sides of said first suspending means adjacent the front end of said assembly; means interconnecting each of said two other suspending means with said elevator structure; and means for operating said elevator structure for operating the three said suspending means simultaneously.

9. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; front and rear cross connection means extending between said units across said main frame and being connected respectively to said mechanism frames for positioning said units on opposite sides of said main frame and for integrating said units into a harvester assembly having front and rear ends; an elevator structure movably mounted on said main frame to extend laterally to both sides of said main frame adjacent and above the rear cross connection means; a first suspending means movably connected at its upper end to said elevator structure substantially midway between said units and connected at its lower end to said rear cross connection means; two other suspending means movably connected to said main frame and to said assembly laterally on opposite sides of said first suspending means adjacent the front end of said assembly; means interconnecting each of said two other suspending means with said elevator structure; means for varying the positions of the connections of said two other suspending means to said main frame; and means for operating said elevator structure for operating the three said suspending means simultaneously.

10. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; front and rear cross connection means extending between said units across said main frame and being connected respectively to said mechanism frames for positioning said units on opposite sides of said main frame and for integrating said units into a harvester assembly having front and rear ends; first suspending means suspending said rear cross connection means from said main frame between said units for rocking of said units vertically and horizontally with respect to said main frame; and two flexible suspending means supporting the front ends of said units, each of said flexible suspending means being pivotally connected at its upper end to said main frame and extending downwardly and rearwardly with respect to said main frame, and being connected to said main frame adjacent the rear end of said asembly; and means connecting each of said flexible suspending means to said assembly between the connections of each of said flexible suspending means to said main frame.

11. In a harvester, a main frame; means on said main frame engageable with the ground for supporting said main frame on and for movement over the ground parallel to the longitudinal center of said main frame; two harvester units, each having front and rear ends and each comprising a mechanism frame and harvester mechanism carried thereby; cross connection means extending between said units across said main frame and being connected to said mechanism frames for positioning said units on opposite sides of said main frame and connecting said units to form an integrated harvester assembly; an elevator structure movably mounted on said main frame to extend laterally to both sides of the longitudinal center line of said main frame above the rear ends of said units; a suspending structure movably connected at its upper end to said elevator structure substantially midway between said units and connected at its lower end to said harvester assembly; two flexible suspending means supporting the front end of said harvester assembly, each of said flexible suspending means being connected to said main frame at points thereon spaced from said suspending structure longitudinally of said harvester assembly, and each of said flexible suspending means also being connected to said elevator structure; and means connecting each of said flexible suspending means to said harvester assembly between the connections of each of said flexible suspending means to said main frame and to said elevator structure.

12. In a harvester, a main frame; means on said main frame engageable with the ground for supporting the main frame on and for movement over the ground; a harvester unit comprising a mechanism frame and harvester mechanism carried thereby; and means for suspending said mechanism frame from said main frame to extend longitudinally of the direction of movement of said main frame with the leading end of said mechanism unit positioned to receive the growing crop, said suspending means comprising a pivotal connection between said main frame and the trailing end portion of said mechanism frame; a flexible suspending means for suspending the leading end of said unit from said main frame and comprising a first part connected at its upper end to said main frame above the leading end of said unit and extending downwardly and rearwardly of said unit, and a second part having a juncture with the lower end of said first part and extending upwardly and rearwardly from said juncture and being connected at its rear end to said main frame; and means on the leading portion of said unit connected to said first and second parts at the juncture thereof.

References Cited in the file of this patent
UNITED STATES PATENTS

| | | |
|---|---|---|
| 1,769,104 | Benjamin | July 1, 1930 |
| 2,388,454 | Weeth et al. | Nov. 6, 1945 |
| 2,702,449 | Pacha | Feb. 22, 1955 |
| 2,707,364 | Wagnon | May 3, 1955 |
| 2,826,887 | Wiltsey | Mar. 18, 1958 |